United States Patent [19]

Lee

[11] Patent Number: 6,067,042
[45] Date of Patent: May 23, 2000

[54] TEST BEACON FOR RADAR SYSTEM

[75] Inventor: Man-gyu Lee, Yongin, Rep. of Korea

[73] Assignee: SamSung Electronics Co., Ltd., Suwon, Rep. of Korea

[21] Appl. No.: 09/123,541

[22] Filed: Jul. 28, 1998

[30] Foreign Application Priority Data

Jul. 29, 1997 [KR] Rep. of Korea ........................ 97-35776

[51] Int. Cl.$^7$ .............................. G01S 7/40; G01S 7/497; G01S 13/00
[52] U.S. Cl. ......................... 342/172; 342/165; 342/169; 342/175; 342/187
[58] Field of Search .................................. 342/5, 6, 7, 8, 342/9, 10, 11, 65, 169, 170, 171, 172, 173, 174, 175, 187

[56] References Cited

U.S. PATENT DOCUMENTS

| | | | |
|---|---|---|---|
| 2,872,673 | 2/1959 | Pleasure ................................... | 342/172 |
| 2,922,157 | 1/1960 | McShan ................................... | 342/171 |
| 3,384,893 | 5/1968 | Prestwood .............................. | 342/187 |
| 4,423,418 | 12/1983 | Pearlman . | |
| 4,673,939 | 6/1987 | Forrest .................................... | 342/174 |
| 5,138,325 | 8/1992 | Koury . | |
| 5,164,734 | 11/1992 | Fredricks et al. . | |
| 5,177,488 | 1/1993 | Wang et al. . | |
| 5,339,087 | 8/1994 | Minarik . | |
| 5,442,360 | 8/1995 | Mignan et al. . | |

*Primary Examiner*—Bernarr E. Gregory
*Attorney, Agent, or Firm*—Robert E. Bushnell, Esq.

[57] ABSTRACT

A test beacon for a radar system includes: a first antenna for receiving a search signal and transmitting a processed search signal, a second antenna for receiving a tracking signal and transmitting a processed tracking signal, a first signal processor for shifting the phase of the received search signal and adjusting it to a predetermined level, a third signal processor for shifting the phase of the received tracking signal and adjusting it to a predetermined level, a search/tracking signal delaying unit for receiving the search and tracking signals phase-shifted by the first and third signal processors, delaying the signals for a predetermined time period, and distributing and outputting the delayed signals, a second signal processor for receiving the delayed search signal and filtering a frequency band of the search signal and adjusting the signal to a predetermined level, a fourth signal processor for receiving the delayed tracking signal and filtering a frequency band of the tracking signal and adjusting the signal to a predetermined level, a first circulator for receiving the search signal received by the first antenna and transmitting the received search signal to the first signal processor and for receiving the tracking signal processed by the second signal processor and transmitting the processed tracking signal to the first antenna, and a second circulator for receiving the tracking signal received by the second antenna and transmitting the received search signal to the third signal processor and for receiving the tracking signal processed by the fourth signal processor and transmitting the processed tracking signal to the second antenna. Since the expensive delay line is commonly used for both the search radar and tracking radar beacons, the manufacturing costs can be reduced and a test beacon for a radar system can be made light weight and small.

14 Claims, 2 Drawing Sheets

TEST BEACON FOR RADAR SYSTEM

CLAIM OF PRIORITY

This application makes reference to, incorporates the same herein, and claims all benefits accruing under 35 U.S.C. §119 from an application for BEACON OF RADAR SYSTEM earlier filed in the Korean Industrial Property Office on Jul. 29, 1997 and there duly assigned Serial No. 35776/1997.

BACKGROUND OF THE INVENTION

1. Field of the Invention

The present invention relates to a test beacon for a radar system. More particularly, the present invention relates to a test beacon for a radar system in which one delay line is shared for two separate test beacons and circulators are used to replace separate receiving and transmitting antennas by a single transmitting/receiving antenna.

2. Description of the Related Art

In a typical radar system, a radar controller searches for a target using a search radar, receives data about the target from a tracking radar, and processes the received data to display the result on a screen. To develop the radar controller of a radar system, it is necessary to receive accurate data about a target from the search an d tracking radars. A test beacon for outputting a signal that is phase-shifted and delayed after being reflected by an imaginary moving target is used for the search and tracking radars.

In an earlier test beacon for a radar system, a test beacon for a search radar includes a reception antenna, an isolator, a bandpass filter, a phase shifter, an amplifier, a delay line, another amplifier, another isolator, an attenuator, a directional coupler, still another isolator, and a transmission antenna arranged in that order.

A test beacon for a tracking radar has the same configuration as that of the test beacon for a search radar as noted above, only differing in that parts of a different frequency band are used according to the frequency of the tracking signal used.

However, in the beacon as above, the parts used are duplicated for each of the frequency bands of the search or tracking signals. Also, since parts having the same function are separately installed at the beacons for a search radar and a tracking radar, manufacturing costs become high and the size of the beacon becomes large.

The following patents each discloses features in common with the present invention but do not teach or suggest the specifically recited test beacon for a radar system of the present invention: U.S. Pat. No. 5,138,325 to Koury, entitled Shipboard Sensor Exercise Apparatus, U.S. Pat. No. 4,423,418 to Pearlman, entitled Simulator Of Multiple Electromagnetic Signal Sources Such As In A Radar Signal Field, U.S. Pat. No. 5,442,360 to Maignan et al., entitled Echo Distance-Measuring System With Calibration Apparatus, U.S. Pat. No. 5,339,087 to Minarik, entitled Wavefront Simulator For Evaluating RF Communication Array Signal Processors, U.S. Pat. No. 5,177,488 to Wang et al. entitled Programmable Fiber Optic Delay Line, And Radar Target Simulation System incorporating The Same, and U.S. Pat. No. 5,164,734 to Fredricks et al., entitled Radar Target With Delayed Reply Means.

SUMMARY OF THE INVENTION

To solve the above problems, it is an objective of the present invention to provide a test beacon for a radar system in which a single antenna is used for transmitting and receiving signals, and one delay line is commonly used for the respective beacons for a search radar and a tracking radar, so that manufacturing costs are reduced and the size of the beacon is minimized.

Accordingly, to achieve the above objective, there is provided a test beacon for a radar system having a first antenna for receiving a search signal and transmitting a processed search signal, a second antenna for receiving a tracking signal and transmitting a processed tracking signal, a first signal processor for shifting the phase of the received search signal and adjusting it to a predetermined level, a third signal processor for shifting the phase of the received tracking signal and adjusting it to a predetermined level, a search/tracking signal delaying unit for receiving the search and tracking signals phase-shifted by the first and third signal processors, delaying the signals for a predetermined time, and distributing and outputting the delayed signals, a second signal processor for receiving the delayed search signal and filtering a frequency band of the search signal and adjusting the signal to a predetermined level, a fourth signal processor for receiving the delayed tracking signal and filtering a frequency band of the tracking signal and adjusting the signal to a predetermined level, a first circulator for receiving the search signal received by the first antenna and transmitting the received search signal to the first signal processor and for receiving the tracking signal processed by the second signal processor and transmitting the processed tracking signal to the first antenna, and a second circulator for receiving the tracking signal received by the second antenna and transmitting the received search signal to the third signal processor and for receiving the tracking signal processed by the fourth signal processor and transmitting the processed tracking signal to the second antenna.

In the present invention, it is preferred that the search/tracking signal delaying unit includes a power combiner for receiving and combining a search signal phase-shifted by and output from the first signal processor and a tracking signal phase-shifted by and output from the third signal processor, a delay line for delaying the signal output from the power combiner for a predetermined time period, and a power divider for dividing the delayed signal and outputting the divided results to the second and fourth signal processors, respectively.

It is preferred in the present invention that the delay line is a wide band optical delay line.

It is preferred in the present invention that each of the first and third signal processors includes an amplifier for amplifying a received signal, a phase shifter for shifting the phase of the amplified signal, and an isolator for preventing reflection of the phase-shifted signal.

It is preferred in the present invention that the second signal processor includes a bandpass filter for receiving a signal divided in the search/tracking signal delaying unit and transmitting a band of a search signal, an amplifier for amplifying the filtered signal, an isolator for preventing reflection of the amplified signal, an attenuator for attenuating the amplified signal to a predetermined level, and a directional coupler for dividing the signal output from the attenuator into a signal transmitted to a monitor and a signal transmitted to the first circulator.

It is preferred in the present invention that the fourth signal processor includes a bandpass filter for receiving a signal divided in the search/tracking signal delaying unit and transmitting a band of a tracking signal, an amplifier for amplifying the filtered signal, an isolator for preventing reflection of the amplified signal, an attenuator for attenuating the amplified signal to a predetermined level, and a directional coupler for dividing the signal output from the attenuator into a signal transmitted to a monitor and a signal transmitted to the second circulator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
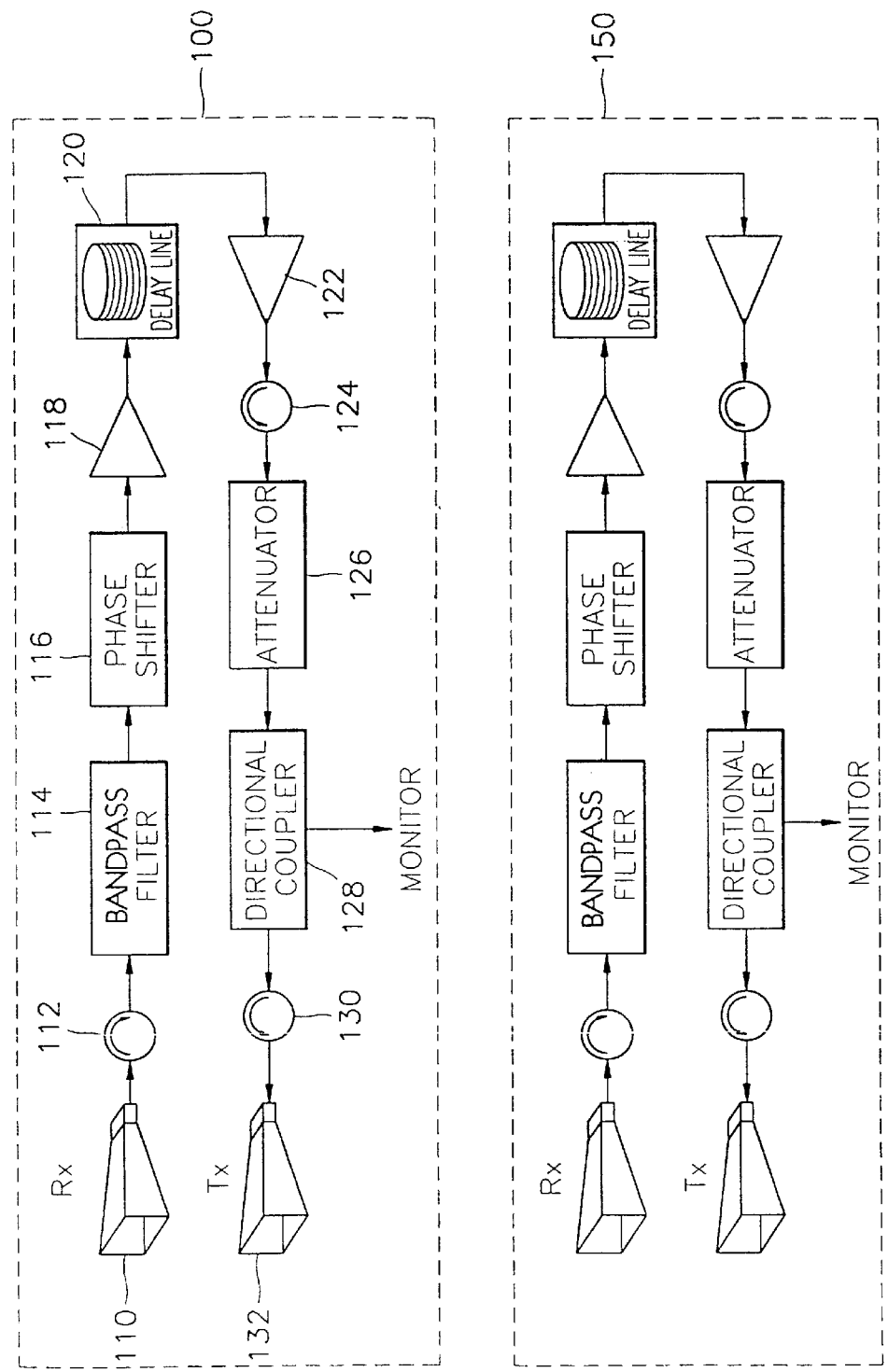
FIG. 1 is a view showing the configuration of an earlier test beacon.

FIG. 1 shows an earlier test beacon. Referring to the drawing, a test beacon 100 for a search radar includes a reception antenna (Rx) 110, isolators 112, 124 and 130, a bandpass filter 114, a phase shifter 116, amplifiers 118 and 122, a delay line 120, an attenuator 126, a directional coupler 128, and a transmission antenna (Tx) 132.

A test beacon 150 for a tracking radar has the same configuration as that of the test beacon 100 for a search radar above, only differing in that parts of a different frequency band are used according to the frequency of the tracking signal used.

In the drawing, the antenna 110 receives a search signal output from a radar system (not shown). The isolator 112 transmits the search signal received from the antenna 110 to the bandpass filter 114 and prevents the antenna 110 from being damaged due to a reflected output signal. That is, the reflected search signal proceeding in a reverse direction is prevented so that the antenna 110 is protected from being damaged. The bandpass filter 114 removes noise included in the search signal transmitted through the isolator 112 and the phase shifter 116 shifts the phase of the search signal filtered by the bandpass filter 114. This is to compensate for movement of an actual target. The amplifier 118 amplifies the search signal phase-shifted by the phase shifter 116 to have an appropriate signal intensity. The delay line 120 delays the search signal amplified by the amplifier 118 for a predetermined time. This is to compensate for the distance between the radar and the actual target by delaying the search signal since the test beacon is installed near the radar system.

The amplifier 122 amplifies the search signal attenuated while passing through the delay line 120. The isolator 124 transmits the amplified search signal to the attenuator 126 and prevents the search signal from proceeding in a reverse direction. The attenuator 126 appropriately attenuates the search signal and outputs the same to the directional coupler 128. The directional coupler 128 outputs a part of the search signal to a monitor (not shown) so that an operator can measure the intensity of the search signal from the monitor. Also, the search signal output from the directional coupler 128 is transmitted to the radar system through the isolator 130 and the antenna 132. Since a tracking signal received by the test beacon 150 for a tracking radar is subjected to the same signal process steps for the phase shift and signal delay, differing only in frequency from that of the search signal processed by the test beacon 100 for a search radar, a separate description of the operation of the test beacon 150 for a tracking radar has been omitted.

Figure 2:
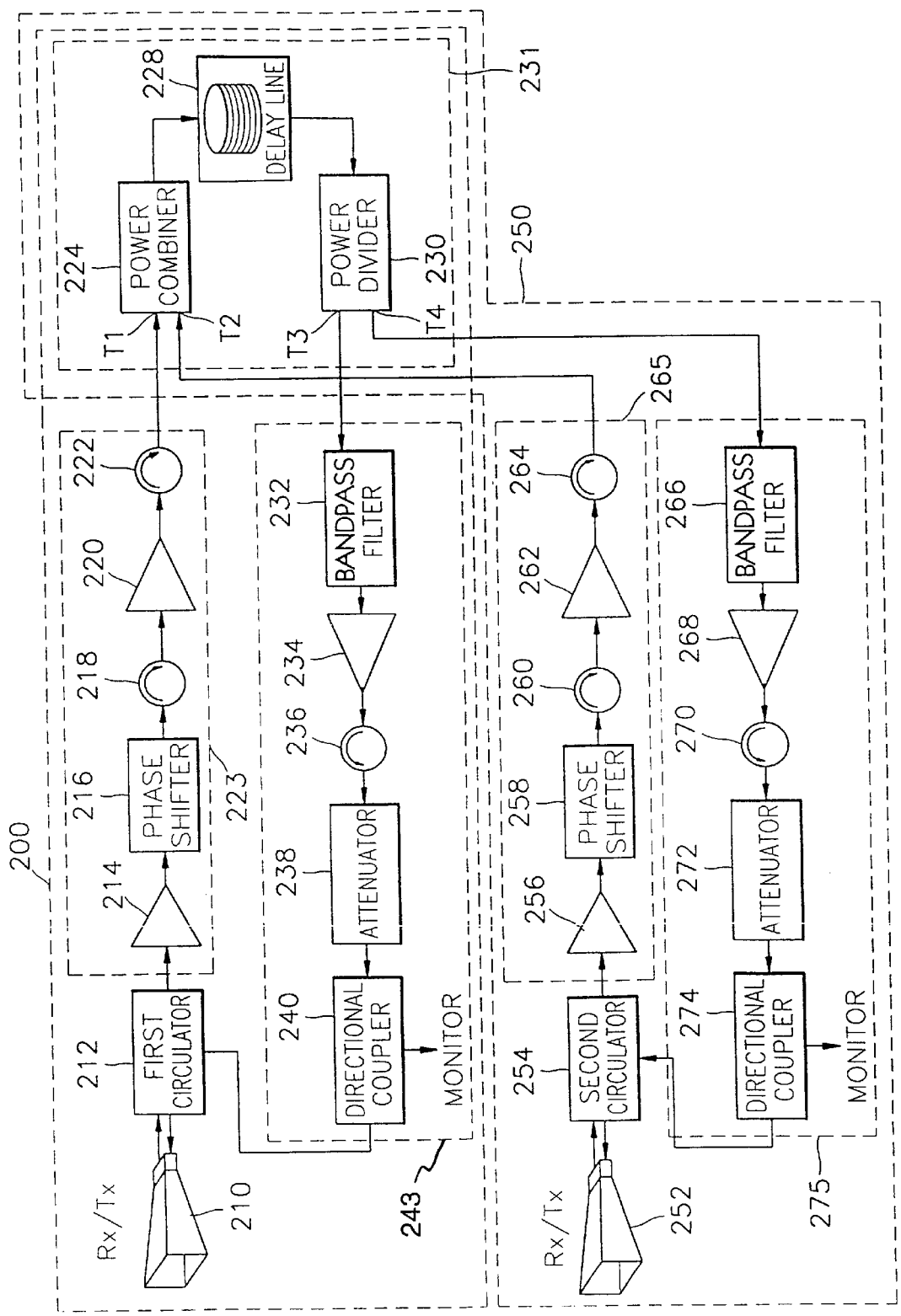
FIG. 2 is a view showing the configuration of a test beacon for a radar system according to the present invention.

Referring to FIG. 2, a test beacon for a radar system according to the present invention includes a test beacon 200 for a search radar and a test beacon 250 for a tracking radar. The beacon for a search radar 200 comprises a first antenna (Rx/Tx) 210 for receiving a search signal and transmitting a processed search signal, a first circulator 212 for transmitting the received search signal to a first signal processor 223 and for receiving the processed search signal and transmitting the received signal to the first antenna 210, the first signal processor 223, a search/tracking signal delaying portion 231, and a second signal processor 243. The first signal processor 223 includes an amplifier 214 for amplifying the search signal transmitted from the first circulator 212, a phase shifter 216 for shifting the phase of the amplified search signal, an isolator 218 for preventing the phase-shifted search signal from proceeding in a reverse direction, another amplifier 220 for amplifying the phase-shifted search signal, and another isolator 222 for preventing the amplified search signal from proceeding in a reverse direction. The search/tracking signal delaying portion 231 includes a power combiner 224 for receiving the phase-shifted search signal output from the first signal processor 223 and a phase-shifted tracking signal via input terminals T1 and T2, respectively, and for coupling the two signals, a delay line 228, which may be an optical delay line, for delaying the signal output from the power combiner 224 for a predetermined time period, and a power divider 230 for distributing the delayed signal output from the delay line 228 via output terminals T3 and T4. The second signal processor 243 includes a bandpass filter 232 for transmitting a frequency band of the search signal of the distributed delayed signal output from the power divider 230 via T3, an amplifier 234, an isolator 236, an attenuator 238, and a directional coupler 240.

Also, the test beacon for a tracking radar 250 comprises a second antenna (Rx/Tx) 252 for receiving a tracking signal and transmitting a processed tracking signal, a second circulator 254 for transmitting the received tracking signal to a third signal processor 265 and for receiving the processed tracking signal and transmitting the received signal to the second antenna 252, the third signal processor 265, the tracking/target signal delaying portion 231, and a fourth signal processor 275. The third signal processor 265 having the same structure as that of the first signal processor 223 includes amplifiers 256 and 262, a phase shifter 258, isolators 260 and 264. The tracking/target signal delaying portion 231 receives the search signal phase-shifted by the first signal processor 223 and the tracking signal phase-shifted by and output from the third signal processor 265 and couples and delays both signals. The fourth signal processor 275 having the same structure as that of the second signal processor 243 includes a bandpass filter 266 for transmitting a frequency band of the tracking signal, an amplifier 268, an isolator 270, an attenuator 272, and a directional coupler 274.

In the beacon 200 for a search radar as shown in FIG. 2, the first antenna 210 receives a search signal transmitted from a radar system (not shown) and transmits the received signal to the first circulator 212. The first circulator 212 transmits the search signal received by the first antenna 210 to the amplifier 214 of the first signal processor 223 and prevents the search signal from proceeding in a reverse direction to protect the first antenna 210 from being damaged. Also, the first circulator 212 receives the search signal processed by and output from the second signal processor 243 and transmits the received signal to the first antenna 210.

In the first signal processor 223, the search signal amplified by the amplifier 214 is phase-shifted in the phase shifter 216 and transmitted to another amplifier 220 via the isolator 218. The search signal amplified by the amplifier 220 passes another isolator 222 and is output to an input end T1 of the power combiner 224 of the search/tracking signal delaying portion 231. The phase shifting Is of the received search signal by the phase shifter 216 is to simulate a signal reflected by an actual target.

In the beacon 250 for a tracking radar, the tracking signal received by the second antenna 252 and passing the second circulator 254 further passes the amplifier 256, the phase shifter 258, the isolator 260, another amplifier 262, and another isolator 264, in sequence, of the third signal processor 265. The tracking signal phase-shifted while passing the third signal processor 265 is transmitted to the other input end T2 of the power combiner 224 of the search/tracking signal delaying portion 231.

The power combiner 224 combines the search and tracking signals input to the input ends T1 and T2 thereof and transmits the combined signal to the delay line 228. The delay line 228, is which may be a wide band optical delay line satisfying the frequency bands of the search and tracking signals, delays time by changing an electrical signal to light and then back to an electrical signal again so that the signal is delayed for a predetermined time period to allow the search and tracking radars (not shown) to respond. The power divider 230 divides the delayed signal and transmits the divided signal to the bandpass filters 232 and 266 via output ends T3 and T4, respectively.

The bandpass filter 232 of the beacon 200 for a search radar passes the band of the search signal of the delayed signal output from the power divider 230. The amplifier 234 amplifies the search signal to an appropriate signal intensity and the amplified signal is adjusted to an appropriate level as it passes the isolator 236 and the attenuator 238. Then, the controlled search signal is transmitted to the directional coupler 240, in which a part of the delayed search signal is output to a monitor (not shown) so that an operator can monitor the search signal. The directional coupler 240 also transmits the delayed search signal to the first circulator 212 to thereby transmit via the first antenna 210.

In the beacon 250 for a tracking radar, the bandpass filter 266 passes only the frequency band of the tracking signal of the delayed signal output from the power divider 230. The tracking signal passing the bandpass filter 266 passes the fourth signal processor 275 including the amplifier 268, the isolator 270, the attenuator 272 and the directional coupler 274 having the same functions as those of the beacon 200 for a search radar. Then, the tracking signal is transmitted to a tracking radar (not shown) through the second circulator 254 and the second antenna 252.

As described above, in the beacon of a radar system according to the present invention, since the expensive delay line is commonly used for both the search radar and tracking radar test beacons, the manufacturing costs can be reduced and a test beacon for a radar system can be made light weight and small.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A test beacon for a radar system comprising:
    a first antenna for receiving a search signal and transmitting a processed search signal;
    a second antenna for receiving a tracking signal and transmitting a processed tracking signal;
    a first signal processor for shifting the phase of the received search signal and adjusting the search signal to a predetermined level;
    a third signal processor for shifting the phase of the received tracking signal and adjusting the tracking signal to a predetermined level;
    a search/tracking signal delaying unit for receiving the search and tracking signals phase-shifted by said first and third signal processor, delaying the signal for a predetermined time period, and distributing and outputting the delayed signals back to said first and third signal processors;
    a second signal processor for receiving the delayed search signal and filtering a frequency band of the search signal and adjusting the search signal to a predetermined level;
    a fourth signal processor for receiving the delayed tracking signal and filtering a frequency band of the tracking signal and adjusting the tracking signal to a predetermined level;
    a first circulator for receiving the search signal received by said first antenna and transmitting the received search signal to said first signal processor and for receiving the tracking signal processed by said second signal processor and transmitting the processed tracking signal to said first antenna; and
    a second circulator for receiving the tracking signal received by said second antenna and transmitting the received search signal to said third signal processor and for receiving the tracking signal processed by said fourth signal processor and transmitting the processed tracking signal to said second antenna.

2. The test beacon for a radar system as claimed in claim 1, said search/tracking signal delaying unit comprising:
    a power combiner for receiving and combining a search signal phase-shifted by and output from said first signal processor and a tracking signal phase-shifted by and output from said third signal processor;
    a delay line for delaying a signal output from said power combiner for a predetermined time period; and
    a power divider for dividing the delayed signal and outputting the divided results to said second and fourth signal processors, respectively.

3. The test beacon for a radar system as claimed in claim 2, said delay line comprising a wide band optical delay line.

4. The test beacon for a radar system as claimed in claim 1, each of said first and third signal processors comprising:
    an amplifier for amplifying a received signal;
    a phase shifter for shifting the phase of the amplified signal; and
    an isolator for preventing reflection of the phase-shifted signal.

5. The test beacon for a radar system as claimed in claim 1, said second signal processor comprises:
    a bandpass filter for receiving a signal divided in said search/tracking signal delaying unit and transmitting a band of a search signal;
    an amplifier for amplifying the filtered signal;

an isolator for preventing reflection of the amplified signal;

an attenuator for attenuating the amplified signal to a predetermined level; and a directional coupler for dividing the signal output from said attenuator into a signal transmitted to a monitor and a signal transmitted to said first circulator.

6. The test beacon for a radar system as claimed in claim 1, said fourth signal processor comprises:

a bandpass filter for receiving a signal divided in said search/tracking signal delaying unit and transmitting a band of a tracking signal;

an amplifier for amplifying the filtered signal;

an isolator for preventing reflection of the amplified signal;

an attenuator for attenuating the amplified signal to a predetermined level; and a directional coupler for dividing the signal output from said attenuator into a signal transmitted to a monitor and a signal transmitted to said second circulator.

7. A test beacon for a radar system comprising:

a first test beacon unit for receiving a search signal and transmitting a processed search signal;

a second test beacon unit for receiving a tracking signal and transmitting a processed tracking signal; and a search/tracking signal delaying unit for receiving partially processed search and tracking signals respectively output from said first and second test beacon units, delaying the partially processed signals for a predetermined time period and distributing and outputting the delayed signals back to the first and second test beacon units.

8. The test beacon for a radar system as claimed in claim 7, said search/tracking signal delaying unit comprising:

a power combiner for receiving and combining said partially processed search signal output from said first test beacon unit and said partially processed tracking signal output by said second test beacon unit;

a delay line for delaying a signal output from said power combiner for said predetermined time period; and a power divider for dividing the delayed signal and outputting the divided results to said first and second test beacon units, respectively.

9. The test beacon for a radar system as claimed in claim 8, said delay line comprising a wide band optical delay line.

10. The test beacon for a radar system as claimed in claim 7, each of said first and second test beacon units comprising an antenna connected to a circulator for receiving a radar signal and outputting it from said circulator for further processing, said circulator receiving a processed signal and outputting it to said antenna for transmission as a radar test signal.

11. The test beacon for a radar system as claimed in claim 10, each of said test beacon units further comprising a phase shifter and at least one amplifier and at least one additional circulator for partially processing a signal output from said circulator by phase shifting and amplifying said signal output from said circulator.

12. The test beacon for a radar system as claimed in claim 10, said first and second test beacon units each further comprising:

a bandpass filter and an amplifier and a circulator and an attenuator and a directional coupler arranged in that order for receiving a signal output from said delaying unit and for providing a signal to said circulator and a signal to a monitor.

13. A method of processing signals in a test beacon for a radar system comprising a first test beacon unit for receiving a search signal and transmitting a processed search signal and a second test beacon unit for receiving a tracking signal and transmitting a processed tracking signal, said method comprising:

combining partially processed signals respectively output from said first and second test beacon units in a power combiner;

delaying a signal output from said power combiner for a predetermined time period; and dividing a delayed signal output from said delay line into two signals which are respectively inputted to said first and second test beacon units, said signal being divided by a power divider.

14. The method of processing signals in a test beacon for a radar system as claimed in claim 13, each of said first and second test beacon unit processing signals by receiving a radar signal on an antenna connected to a circulator and phase shifting and amplifying a signal output from the circulator to partially process the radar signal and bandpass filtering and amplifying and attenuating a signal output from the delaying unit and providing a signal to the circulator for output from the antenna as a processed radar signal.

* * * * *